(12) United States Patent
Kettner et al.

(10) Patent No.: US 12,504,817 B2
(45) Date of Patent: Dec. 23, 2025

(54) ELECTRICAL CIRCUIT ASSEMBLY FOR A GLOVE

(71) Applicant: Workaround GmbH, Munich (DE)

(72) Inventors: Michael Kettner, Munich (DE); Danijel Juric, Munich (DE); Simon Armbruster, Munich (DE)

(73) Assignee: WORKAROUND GMBH, Munich (DE)

( * ) Notice: Subject to any disclaimer, the term of this patent is extended or adjusted under 35 U.S.C. 154(b) by 0 days.

(21) Appl. No.: 18/768,618

(22) Filed: Jul. 10, 2024

(65) Prior Publication Data

US 2025/0021160 A1    Jan. 16, 2025

(30) Foreign Application Priority Data

Jul. 11, 2023   (DE) .................. 10 2023 118 306.0

(51) Int. Cl.
| | | |
|---|---|---|
| *A41D 19/00* | (2006.01) | |
| *A41D 1/00* | (2018.01) | |
| *G06F 3/01* | (2006.01) | |
| *G06F 3/02* | (2006.01) | |
| *H05K 1/18* | (2006.01) | |

(52) U.S. Cl.
CPC ............ *G06F 3/014* (2013.01); *G06F 3/0227* (2013.01); *H05K 1/189* (2013.01)

(58) Field of Classification Search
None
See application file for complete search history.

(56) References Cited

U.S. PATENT DOCUMENTS 1,165,970 A   12/1915   Edward
1,173,269 A    2/1916   Christian
(Continued)

FOREIGN PATENT DOCUMENTS

AT          521938 A3    12/2021
AT          521938 B1    12/2021
(Continued)

OTHER PUBLICATIONS

Albert Schweitzer: "Rigid-Flex, Flex and Semi-Flex Leiterplatten Technologie", Mar. 17, 2017, https://www.flowcad.ch/cms/upload/downloads/PCBRoadshow20IFlex.pdf (89 pages).
(Continued)

*Primary Examiner* — Carl Adams
(74) *Attorney, Agent, or Firm* — DILWORTH IP, LLC

(57) ABSTRACT

An electrical circuit assembly for a glove as well as a glove. The electrical circuit assembly includes a trigger and at least one function button as well as a holder. An electronic module can be inserted into the holder in order to be held in place by the holder. The holder includes at least one electrical contact which physically contacts an electrical mating contact of the electrical module when the electronic module is inserted. In addition, the electrical circuit assembly includes a voltage divider, wherein the at least one electrical contact is connected electrically to the trigger and the at least one function button via the voltage divider so that depending on the respective state of the trigger and/or the at least one function button, a different voltage value is determinable at the at least one electrical contact.

20 Claims, 6 Drawing Sheets

(56) References Cited

U.S. PATENT DOCUMENTS

| | | |
|---|---|---|
| 1,267,436 A | 5/1918 | William |
| 2,172,167 A | 9/1939 | Abraham |
| 3,512,776 A | 5/1970 | Thomas, Sr. |
| 3,700,836 A | 10/1972 | Rackson |
| 3,790,168 A | 2/1974 | Hashimoto |
| 4,504,980 A | 3/1985 | Butcher |
| 4,575,075 A | 3/1986 | Tarbox |
| 4,652,141 A | 3/1987 | Arai |
| 4,658,441 A | 4/1987 | Smith |
| 4,766,299 A | 8/1988 | Tierney |
| 5,133,233 A | 7/1992 | Erwin |
| 5,191,197 A | 3/1993 | Metlitsky |
| 5,212,372 A | 5/1993 | Quick |
| 5,255,167 A | 10/1993 | Toussaint |
| 5,319,185 A | 6/1994 | Obata |
| 5,329,106 A | 7/1994 | Hone |
| 5,340,972 A | 8/1994 | Sandor |
| 5,365,213 A | 11/1994 | Paull |
| 5,396,053 A | 3/1995 | Swartz |
| 5,397,296 A | 3/1995 | Sydor |
| 5,406,649 A | 4/1995 | Bolembach |
| 5,459,883 A | 10/1995 | Garceau-Verbeck |
| 5,514,861 A | 5/1996 | Swartz |
| 5,550,366 A | 8/1996 | Roustaei |
| 5,580,154 A | 12/1996 | Coulter |
| 5,592,694 A | 1/1997 | Yewer, Jr. |
| 5,610,387 A | 3/1997 | Bard |
| 5,625,180 A | 4/1997 | Hanson |
| 5,640,712 A | 6/1997 | Hansen |
| 5,654,534 A | 8/1997 | Coleman |
| 5,787,896 A | 8/1998 | Sackett |
| 5,898,161 A | 4/1999 | DeVita |
| 5,924,136 A | 7/1999 | Ogean |
| 6,154,199 A | 11/2000 | Butler |
| 6,232,960 B1 | 5/2001 | Goldman |
| 6,234,393 B1 | 5/2001 | Paratore |
| 6,341,376 B1 | 1/2002 | Smerdon, Jr. |
| 6,505,776 B1 | 1/2003 | Wilz, Sr. |
| 6,853,293 B2 | 2/2005 | Swartz |
| 6,991,364 B2 | 1/2006 | Yang |
| 7,307,242 B1 | 12/2007 | Chen |
| 7,480,944 B2 | 1/2009 | Nascimento |
| 7,504,949 B1 | 3/2009 | Rouaix |
| 7,837,112 B2 | 11/2010 | An |
| 7,959,314 B1 | 6/2011 | Rodriguez |
| 8,038,310 B1 | 10/2011 | Hale |
| 8,230,522 B1 | 7/2012 | Bell |
| 8,235,294 B2 | 8/2012 | Miller |
| 8,376,759 B2 | 2/2013 | Debock |
| 8,449,541 B2 | 5/2013 | Schneider |
| 8,523,377 B1 | 9/2013 | York |
| 8,540,389 B2 | 9/2013 | Tang |
| 8,562,165 B2 | 10/2013 | Thompson |
| 9,082,293 B2 | 7/2015 | Wellman |
| 9,104,271 B1 | 8/2015 | Adams et al. |
| 9,235,742 B1 | 1/2016 | Qaddoura |
| 9,301,562 B1 | 4/2016 | Chen |
| 9,785,877 B1 | 10/2017 | Fink |
| 9,842,288 B1 | 12/2017 | Debates |
| 9,895,106 B1 | 2/2018 | Graybill |
| 9,900,061 B1 | 2/2018 | Lui |
| 10,064,276 B2 | 8/2018 | Williams |
| 10,135,213 B2 | 11/2018 | Brunnbauer |
| 10,353,466 B1 | 7/2019 | Keller et al. |
| 10,537,143 B2 | 1/2020 | Guenther |
| 10,695,262 B2 | 6/2020 | Brown et al. |
| 10,789,436 B1 | 9/2020 | Lim |
| 10,817,689 B2 | 10/2020 | Mazzone |
| 10,996,754 B2 | 5/2021 | Bosworth |
| D922,063 S | 6/2021 | Kirchner |
| 11,044,898 B2 | 6/2021 | Deeb |
| 11,059,076 B2 | 7/2021 | Bauer |
| 11,093,725 B2 | 8/2021 | Mistkawi |
| 11,121,515 B2 | 9/2021 | Chahine |
| 11,182,575 B2 | 11/2021 | Sakamoto |
| D943,585 S | 2/2022 | Engineer |
| D944,814 S | 3/2022 | Huber |
| D945,423 S | 3/2022 | Lim |
| 11,326,960 B2 | 5/2022 | Larsen |
| 11,361,391 B2 | 6/2022 | Ottnad |
| D960,162 S | 8/2022 | Lim |
| D964,376 S | 9/2022 | Sittig |
| 11,464,450 B2 | 10/2022 | Huang |
| 11,470,895 B2 | 10/2022 | Guenther |
| 11,508,018 B2 | 11/2022 | Yoshimoto |
| 11,520,314 B2 | 12/2022 | Schwarz |
| 11,558,909 B2 | 1/2023 | Hutter |
| 11,589,625 B2 | 2/2023 | Oner |
| D986,253 S | 5/2023 | Kettner |
| 11,759,288 B2 | 9/2023 | Lenzenhuber |
| 11,792,555 B2 | 10/2023 | Till |
| 11,899,838 B2 | 2/2024 | Hogbin |
| 11,913,145 B2 | 2/2024 | Laukamp |
| 11,914,771 B2 | 2/2024 | Kirchner |
| 11,954,556 B1 | 4/2024 | Fracassi |
| 2002/0080031 A1 | 6/2002 | Mann |
| 2002/0163495 A1 | 11/2002 | Doynov |
| 2002/0194668 A1 | 12/2002 | Kwon |
| 2003/0006962 A1 | 1/2003 | Bajramovic |
| 2003/0011469 A1 | 1/2003 | Bush |
| 2003/0026170 A1 | 2/2003 | Yang |
| 2004/0025227 A1 | 2/2004 | Jaeger |
| 2004/0128736 A1 | 7/2004 | Raz |
| 2005/0052412 A1 | 3/2005 | McRae |
| 2006/0033710 A1 | 2/2006 | Bajramovic |
| 2006/0044112 A1 | 3/2006 | Bridgelall |
| 2006/0108425 A1 | 5/2006 | Wiklof |
| 2007/0083968 A1 | 4/2007 | Stokes |
| 2007/0083979 A1 | 4/2007 | Daniels |
| 2007/0146127 A1 | 6/2007 | Stilp |
| 2007/0245454 A1 | 10/2007 | Eklund |
| 2007/0288104 A1 | 12/2007 | Yamauchi |
| 2008/0054062 A1 | 3/2008 | Gunning |
| 2008/0071429 A1 | 3/2008 | Kraimer |
| 2008/0136778 A1 | 6/2008 | Hursh |
| 2008/0262666 A1 | 10/2008 | Manning |
| 2009/0056107 A1 | 3/2009 | Williams |
| 2009/0057289 A1 | 3/2009 | Williams |
| 2009/0057290 A1 | 3/2009 | Williams |
| 2009/0121026 A1 | 5/2009 | Druker |
| 2009/0156309 A1 | 6/2009 | Weston |
| 2009/0179739 A1 | 7/2009 | Kim |
| 2009/0247299 A1 | 10/2009 | Conticello |
| 2010/0023314 A1 | 1/2010 | Hernandez-Rebollar |
| 2010/0090949 A1 | 4/2010 | Tianqiao |
| 2010/0097195 A1 | 4/2010 | Majoros |
| 2010/0156783 A1 | 6/2010 | Bajramovic |
| 2010/0234182 A1 | 9/2010 | Hoffman |
| 2011/0016609 A1 | 1/2011 | Phelps |
| 2011/0078842 A1 | 4/2011 | Tang |
| 2011/0122601 A1 | 5/2011 | Waters |
| 2011/0296576 A1 | 12/2011 | Mitchell |
| 2012/0025945 A1 | 2/2012 | Yazadi |
| 2012/0157263 A1 | 6/2012 | Sivak |
| 2012/0187192 A1 | 7/2012 | Lee |
| 2012/0223143 A1 | 9/2012 | Turbovich |
| 2013/0087544 A1 | 4/2013 | Kremer |
| 2013/0197720 A1 | 8/2013 | Kraimer |
| 2013/0258644 A1 | 10/2013 | Comunale |
| 2014/0096306 A1 | 4/2014 | Hill |
| 2014/0125577 A1 | 5/2014 | Hoang |
| 2014/0132410 A1 | 5/2014 | Chang |
| 2014/0172134 A1 | 6/2014 | Meschter |
| 2014/0194166 A1 | 7/2014 | Falck |
| 2014/0214631 A1 | 7/2014 | Hansen |
| 2014/0215686 A1 | 8/2014 | McMakin, Jr. |
| 2014/0249944 A1 | 9/2014 | Hicks |
| 2014/0282923 A1 | 9/2014 | Narayan |
| 2014/0366249 A1 | 12/2014 | West |
| 2015/0040880 A1 | 2/2015 | Tseng |
| 2015/0070162 A1 | 3/2015 | Vorhies |
| 2015/0130698 A1 | 5/2015 | Burgess |
| 2015/0150321 A1 | 6/2015 | Vorhies |
| 2015/0257733 A1 | 9/2015 | Corbett, III |

(56) References Cited

U.S. PATENT DOCUMENTS

| | | | |
|---|---|---|---|
| 2015/0286976 | A1 | 10/2015 | Hirschfeld |
| 2015/0314195 | A1 | 11/2015 | Bekri |
| 2015/0375042 | A1 | 12/2015 | Schaffer |
| 2016/0016065 | A1 | 1/2016 | Tan |
| 2016/0018901 | A1 | 1/2016 | Woolley |
| 2016/0033238 | A1 | 2/2016 | Cooper |
| 2016/0054798 | A1* | 2/2016 | Messingher ............ G06F 3/014 345/156 |
| 2016/0066636 | A1 | 3/2016 | West |
| 2016/0068214 | A1 | 3/2016 | Tang |
| 2016/0128406 | A1 | 5/2016 | Shiue |
| 2016/0161301 | A1 | 6/2016 | Guenther |
| 2016/0174897 | A1 | 6/2016 | Sherman |
| 2016/0284236 | A1 | 9/2016 | Bavunoglu |
| 2017/0068276 | A1 | 3/2017 | Wagman |
| 2017/0119553 | A1 | 5/2017 | Cipriani |
| 2017/0168565 | A1 | 6/2017 | Cohen |
| 2017/0215497 | A1 | 8/2017 | Frederick |
| 2017/0265561 | A1 | 9/2017 | Beers |
| 2017/0296098 | A9 | 10/2017 | Ban |
| 2017/0338610 | A1 | 11/2017 | Brunnbauer |
| 2018/0027344 | A1 | 1/2018 | Dzarnoski, Jr. |
| 2018/0146720 | A1 | 5/2018 | Sittig |
| 2018/0213758 | A1 | 8/2018 | Deeb |
| 2018/0295908 | A1 | 10/2018 | Hollo |
| 2018/0326592 | A1 | 11/2018 | Kogan |
| 2018/0376043 | A1 | 12/2018 | Schannath |
| 2019/0197273 | A1 | 6/2019 | Mazzone |
| 2019/0209086 | A1 | 7/2019 | Huang |
| 2019/0213363 | A1 | 7/2019 | Sugiura |
| 2019/0216144 | A1 | 7/2019 | York |
| 2019/0364996 | A1 | 12/2019 | Kettner |
| 2020/0022433 | A1 | 1/2020 | Lu |
| 2020/0134275 | A1 | 4/2020 | Sakamoto |
| 2020/0160016 | A1 | 5/2020 | Sakamoto |
| 2020/0237032 | A1 | 7/2020 | Berlips |
| 2020/0245939 | A1 | 8/2020 | Sittig |
| 2020/0305522 | A1 | 10/2020 | Ruhland |
| 2020/0359721 | A1 | 11/2020 | Meroe |
| 2020/0404993 | A1 | 12/2020 | Phillips |
| 2021/0033472 | A1 | 2/2021 | Turner |
| 2021/0219639 | A1 | 7/2021 | Kettner |
| 2021/0262127 | A1 | 8/2021 | Laukamp |
| 2021/0307433 | A1 | 10/2021 | Hollo |
| 2021/0386132 | A1 | 12/2021 | Goldberg-Poch |
| 2022/0053854 | A1* | 2/2022 | Oner .................. A41D 19/0027 |
| 2022/0100895 | A1 | 3/2022 | Kirchner |
| 2022/0159355 | A1 | 5/2022 | Nöllgen |
| 2023/0112442 | A1 | 4/2023 | Kettner |
| 2023/0115522 | A1 | 4/2023 | Hutter |
| 2024/0111363 | A1 | 4/2024 | Cha et al. |
| 2024/0164459 | A1 | 5/2024 | Clark |
| 2024/0237767 | A1 | 7/2024 | Kettner |
| 2025/0061603 | A1 | 2/2025 | Fukui et al. |

FOREIGN PATENT DOCUMENTS

| | | |
|---|---|---|
| CN | 2109745 | 7/1992 |
| CN | 204217957 U | 3/2015 |
| CN | 107616787 A | 1/2018 |
| CN | 108272443 A | 7/2018 |
| CN | 109891340 A | 6/2019 |
| CN | 109891342 A | 6/2019 |
| CN | 110327049 A | 10/2019 |
| CN | 110647847 A | 1/2020 |
| CN | 112218387 A | 1/2021 |
| CN | 112294538 A | 2/2021 |
| CN | 306506527 S | 5/2021 |
| CN | 113144571 A | 7/2021 |
| CN | 110327049 B | 11/2021 |
| CN | 109891340 B | 7/2022 |
| CN | 116114948 A | 5/2023 |
| DE | 202005003216 | 5/2005 |
| DE | 202013105192 | 12/2013 |
| DE | 102014117164 | 1/2016 |
| DE | 202015107112 | 1/2016 |
| DE | 102015111506 A1 | 4/2016 |
| DE | 102015113847 | 4/2016 |
| DE | 102015214331 | 2/2017 |
| DE | 102015122281 | 6/2017 |
| DE | 102015224308 | 6/2017 |
| DE | 102016109113 A1 | 11/2017 |
| DE | 102016109117 | 11/2017 |
| DE | 102017107357 A1 | 4/2018 |
| DE | 102016123093 A1 | 5/2018 |
| DE | 202017102714 U1 | 8/2018 |
| DE | 102017203495 | 9/2018 |
| DE | 102018202207 A1 | 8/2019 |
| DE | 102018105578 A1 | 9/2019 |
| DE | 102018203035 A1 | 9/2019 |
| DE | 102018112945 A1 | 12/2019 |
| DE | 102018105578 B4 | 6/2020 |
| DE | 102019102685 A1 | 8/2020 |
| DE | 102019102730 A1 | 8/2020 |
| DE | 102019113964 A1 | 11/2020 |
| DE | 102019118887 A1 | 1/2021 |
| DE | 102019118969 A1 | 1/2021 |
| DE | 102019131235 A1 | 5/2021 |
| DE | 102020100985 A1 | 7/2021 |
| DE | 102020106369 A1 | 9/2021 |
| DE | 102020122573 A1 | 3/2022 |
| DE | 102020125554 A1 | 3/2022 |
| DE | 102021200888 A1 | 8/2022 |
| DE | 102019131235 B4 | 9/2022 |
| DE | 102021122485 A1 | 3/2023 |
| DE | 102021134380 A1 | 6/2023 |
| DE | 102022132061 A1 | 6/2024 |
| DE | 102023000106 B3 | 6/2024 |
| EP | 0613762 | 9/1994 |
| EP | 1894481 A1 | 3/2008 |
| EP | 2578096 A1 | 4/2013 |
| EP | 2693689 | 2/2014 |
| EP | 3069623 | 9/2016 |
| EP | 3208687 | 8/2017 |
| EP | 3381839 A1 | 10/2018 |
| EP | 3644217 A1 | 4/2020 |
| EP | 3654229 A1 | 5/2020 |
| EP | 3381839 B1 | 1/2022 |
| EP | 4012599 A1 | 6/2022 |
| EP | 3529675 B1 | 12/2022 |
| EP | 4374727 A1 | 5/2024 |
| GB | 2386667 A | 9/2003 |
| GB | 2386677 | 9/2003 |
| GB | 2422527 | 8/2006 |
| GB | 2441295 | 3/2008 |
| GB | 2567214 A | 4/2019 |
| IT | 201700092386 A1 | 2/2019 |
| IT | 202000002125 A1 | 8/2021 |
| JP | 2001084329 A | 3/2001 |
| JP | 2011094246 | 5/2011 |
| JP | 2020503582 A | 1/2020 |
| JP | 7105766 B2 | 7/2022 |
| KR | 20100024593 A | 3/2010 |
| KR | 20110115497 A | 10/2011 |
| KR | 20210127051 A | 10/2021 |
| RU | 210103 U1 | 3/2022 |
| TW | M484318 | 8/2014 |
| WO | 9318675 | 9/1993 |
| WO | 9850839 | 11/1998 |
| WO | 02088918 | 11/2002 |
| WO | 03005176 | 1/2003 |
| WO | 2006077572 | 7/2006 |
| WO | 2008075859 | 6/2008 |
| WO | 2012036775 | 3/2012 |
| WO | 2014011196 | 1/2014 |
| WO | 2016012480 | 1/2016 |
| WO | 2017062621 | 4/2017 |
| WO | 2018073420 A1 | 4/2018 |
| WO | 2018076067 A1 | 5/2018 |
| WO | 2018099430 A1 | 6/2018 |
| WO | 2019018702 A1 | 1/2019 |
| WO | 2020117166 A3 | 7/2020 |
| WO | 2020/159057 A1 | 8/2020 |

(56) References Cited

FOREIGN PATENT DOCUMENTS

| WO | 2021014179 A3 | 4/2021 |
|----|---------------|--------|
| WO | 2021099138 A1 | 5/2021 |
| WO | 2021101402 A1 | 5/2021 |
| WO | 2021156709 A1 | 8/2021 |
| WO | 2022035820 A1 | 2/2022 |
| WO | 2023019535 A1 | 2/2023 |
| WO | 2024023009 A1 | 2/2024 |

OTHER PUBLICATIONS

Borghetti M. et al., "Sensorized Glove for Measuring Hand Finger Flexion for Rehabilitation Purposes," IEEE Transactions on Instrumentation and Measurement, vol. 62, No. 12, Dec. 2013.

Dipietro L. et al., "A Survey of Glove-Based Systems and Their Applications," IEEE Transactions on Systems, Man, and Cybernetics—Part C: Applications and Reviews, vol. 38, No. 4, Jul. 2008.

Kim, J-H. et al., 3-D Hand Motion Tracking and Gesture Recognition Using a Data Glove, IEEE International Symposium on Industrial Electronics (ISIE 2009), Seoul Olympic Parktel, Seoul, Korea, Jul. 5-8, 2009.

King, R. C. et al., "Development of a Wireless Sensor Glove for Surgical Skills Assessment," IEEE Transactions on Information Technology in Biomedicine, vol. 13, No. 5, Sep. 2009.

Simone, L. K. et al., "A low cost instrumented glove for extended monitoring and functional hand assessment," Journal of Neuroscience Methods 160 (2007) 335-348.

Sturman, D.J. et al., "A Survey of Glove-based Input," IEEE Computer Graphics & Applications (1994) 33-39.

Ziegler, J. et al., "Advanced Interaction Metaphors for RFID-Tagged Physical Artefacts," 2011 IEEE International Conference on RFID-Technologies and Applications, 73-80.

* cited by examiner

ELECTRICAL CIRCUIT ASSEMBLY FOR A GLOVE

FIELD OF THE INVENTION

The present invention relates to an electrical circuit assembly for a glove, an electronic module that can be inserted into the electrical circuit assembly and a glove that comprises an electrical circuit assembly according to the invention.

BACKGROUND

Gloves comprising electrical triggers are known and are used, for example, in combination with one or more electronic modules. These electronic modules usually have sensors and can also be attached to the glove so that a wearable device ensues, what is termed a "wearable".

For example, the electronic module is a barcode scanner and the trigger triggers a scanning process. The trigger can also be used for other purposes, such as counting processes or operating further units of the wearable.

Known wearables typically only have one input option, namely the trigger. Thus, only one function can be executed. A bidirectional communication with the electronic module, such as the input of information, or the selection of an operating mode is not easily possible.

The requirements for these also increase with the increasing distribution of such wearables. In particular, there is the desire to enable complex interactions with the wearable or the electronic module.

It is thus the object of the invention to provide an electrical circuit assembly for a glove, an electronic module that is inserted into the electrical circuit assembly and a glove (wearable) which enables this complex type of interaction and at the same time is producible economically using simple means.

SUMMARY OF THE INVENTION

The object is solved according to the independent claims in each case by means of an electrical circuit assembly for a glove, by means of an electronic module that can be inserted into the electrical circuit assembly and by means of a glove that comprises such an electrical circuit assembly. Further aspects of the invention are specified in the dependent claims and are mentioned in the following description.

In particular, the object is solved by an electrical circuit assembly for a glove that comprises a trigger comprising a closed and an open state and at least one function button comprising a closed and an open state. In addition, the electrical circuit assembly comprises a holder. An electronic module can be inserted into the holder in order to be held in place by the holder. The holder comprises at least one electrical contact which physically contacts an electrical mating contact of the electrical module when the electronic module is inserted. Moreover, the electrical circuit assembly comprises a voltage divider. Said at least one electrical contact is connected electrically to the trigger and said at least one function button via the voltage divider so that depending on each state of the trigger (open; closed) and/or said at least one function button (open; closed) a different voltage value is determinable at said at least one electrical contact.

Through the provision of a trigger or at least one further input option in the form of at least one function button, more complex interaction with the electronic module can be enabled that goes beyond a mere triggering. Through the connection of the trigger and said at least one function button via a voltage divider, different voltage values—depending on the state of the trigger/said at least one function button—can be determined at said at least one electrical contact. In the simplest embodiment, a specific voltage value (or a voltage value range) can be allocated to each function button (and the trigger) via the voltage divider so that the determined voltage can be allocated to the actuation of the corresponding function button or the trigger. With each further function button, the input options thus increase without needing to increase the number of electrical contacts on the holder that must contact an inserted electronic module (or its electrical mating contact(s)) in order to determine the voltage values. For example, an existing electronic module can be thus triggered and operated using a modified electrical circuit assembly after any adaptation of the software. A modified electrical circuit assembly can comprise, for example, further function buttons or no function buttons. The number of electrical contacts of the electrical circuit assembly that physically contact an electrical mating contact of the electronic module when the electronic module is inserted can however remain the same. Thus, high downward compatibility of the electronic module is ensured.

In particular, the circuit assembly can comprise at least two function buttons (or exactly two function buttons), or at least three function buttons (or exactly three function buttons), or at least four function buttons (or exactly four function buttons). Each of the function buttons can have a closed and an open state, wherein the function buttons are connected electrically to said at least one electrical contact via the voltage divider. Thus, further input options can be provided in order to provide correspondingly complex interaction (for example 4 function buttons=4 additional functions).

Said at least one function button or the function buttons can be arranged on the holder. In particular, the function buttons can be arranged on the holder on the side. In one aspect of the invention, the function buttons can be arranged on the holder in such a way that their position when the electronic module is inserted correlates to the control fields shown on a display of the electronic module. Thus, the interaction is simplified as the user recognises intuitively which function (shown by a control field) has been executed by actuating the respective correlating function button.

The trigger, however, can be arranged spaced apart from the holder. Preferably, the trigger is located in a position that the user can easily reach during the user's normal work (trigger section). For example, if the circuit assembly is integrated into a glove or mounted on this, the trigger can be positioned in such a way that the user can operate the trigger using a finger (preferably the thumb) of the hand on which the glove is being worn. For the operation of the function buttons that are arranged on the holder, the user must usually use the other hand.

In one aspect of the embodiment, the trigger can be a normally closed (NC) switch element or a normally open (NO) switch element. In the case of an NC switch element, the trigger is in the closed state if no external forces act upon it (i.e. it is not actuated). In the case of an NO switch element, the trigger is in the open state if no external forces act upon it (i.e. it is not actuated).

Said at least one function button or the function buttons can also be an NC switch element or an NO switch element, wherein combinations of NC and NO switch elements are also possible depending on the type of voltage divider used.

In particular, the voltage value (or voltage value range) determinable at the electrical contact can be characteristic for the states of all function buttons, in any event when the trigger is in the open state. Therefore, the voltage value (or voltage value range) cannot only be characteristic for the respective function buttons, but also for combinations of pressed function buttons. It is thus possible to differentiate whether single function buttons are actuated or a combination of different function buttons is actuated. Thus, $2^n$ functions can be commanded using n buttons. In the case of four function button (n=4), 16 functions can thus be commanded by means of the various combination options.

In addition, the inserted electronic module can be configured to recognise sequences of voltage values and/or time periods of voltage values. Thus, multiple actuations (such as double clicks, triple clicks), prolonged actuations (e.g. pressing the button for 5 seconds) and actuation sequences can also be used for the interactions.

In one aspect of the invention, the voltage value (or voltage value range) determinable at the electrical contact when actuating the trigger can be independent of the state of the function buttons. In other words, the actuation of the trigger overwrites the state of the function buttons so that, for example, a main function of the electronic module (such as scanning) can always be executed.

The voltage divider can comprise at least one capacitor which is allocated to said at least one function button. Similarly, the voltage divider can comprise a plurality of capacitors, wherein at least one capacitor is allocated to each function button. The capacitor (or the capacitors) can be connected to the allocated function button in such a way that when actuating the function button the voltage value determinable at the electrical contact sinks from a first voltage to a measuring voltage. The first voltage can be above the normal voltage level (neither function button(s) nor trigger is actuated) so that when actuating the function button a voltage peak (voltage value=first voltage) initially forms that then sinks to the measuring voltage. The difference of the first voltage to the measuring voltage can be characteristic for the actuation of the trigger, the corresponding function button and/or a combination of function buttons.

The generation of a voltage peak makes it possible to only then activate the measurement of the voltage value if such a peak has been detected. Thus, the electronic module can be operated in an energy-efficient manner and the actuation of the function buttons/the trigger can be reliably recognised.

In addition, the voltage divider can comprise at least one diode (in particular Schottky diode) that is allocated to said at least one function button. In this case, the capacitor and the diode can be connected to the function button in such a way that when actuating the function button the voltage value determinable at the electrical contact increases until it attains a threshold voltage (voltage peak). The threshold voltage can trigger a hardware interrupt and then stabilise in the case of a lower measurable voltage value.

In one aspect, the holder comprises two electrical contacts that each physically contact an electrical mating contact of the electronic module when the electronic module is inserted. The two electrical contacts can be connected electrically to said one voltage divider so that depending on the respective state of the trigger and/or said at least one function button a different voltage value is determinable at the two electrical contacts, wherein the two electrical contacts are preferably the only electrical contacts of the holder that physically contact the electrical mating contacts of the inserted electronic module. For example, a first electrical contact can be a ground contact and the second electrical contact can be a signal or potential contact. Similarly, the first electrical contact can comprise a first potential and the second electrical contact a second potential. The voltage gradient between the two contacts is the determinable voltage value.

Furthermore, the trigger and said at least one electrical contact can be connected electrically to each other via a signal line, in particular a flex PCB (flexible printed circuit board). In addition, said at least one function button (or the function buttons) and said at least one electrical contact can be connected electrically to each other via a signal line, in particular a flex PCB.

The signal lines can be designed as cables, wires, electrically conductive textiles and/or as electrically conductive threads. Similarly, the signal lines can be designed as conductor paths of a PCB, in particular a flex PCB. Conductor paths are also provided on the flex PCB for the electrical connection. The flex PCB can comprise at least one metallization layer in which the conductor paths are placed. The conductor paths can be designed redundantly so that damage to part of the conductor paths does not impair the functioning of the electrical circuit assembly. For example, the conductor paths can comprise a reticulated structure so that the trigger and/or the function buttons are connected to said at least one electrical contact in each case via several network meshes connected in parallel. If one of the network meshes is damaged, this does not affect the functioning of the electrical circuit assembly.

In particular, the trigger, said at least one function button (or the function buttons) and said at least one electrical contact can be connected electrically to each other via a shared flex PCB. This enables the flex PCB to be produced and integrated into the electrical circuit assembly simply and cost-effectively.

The object is also solved by means of an electronic module which is insertable into the holder of the electrical circuit assembly described previously. The electronic module comprises at least one mating contact which physically contacts said at least one electrical contact of the electrical circuit assembly when the electronic module is inserted into the holder. In one aspect, the electronic module comprises at least two (preferably exactly two) electrical mating contacts, which each physically contact a corresponding electrical contact of the electrical circuit assembly when the electronic module is inserted into the holder. The electronic module is triggerable by actuating the trigger and in further functions operable by actuating said at least one function button.

To trigger and operate further functions, the electronic module can determine different voltage values at said at least one electrical contact when it is inserted into the holder. As described previously, different voltage values are determinable depending on whether the trigger and/or a function button and/or a combination of function buttons are actuated. A function allowing the operation of the electronic module is allocated to at least one voltage value or one voltage value range.

The voltage value to which the function is allocated can be an absolute value or a relative value. Similarly, the voltage value range to which the function is allocated can comprise absolute values (or range limits) or relative values (or range limits). For example, an actual voltage applied can be determined, to which a function is allocated (absolute voltage value). Similarly, a function can be allocated to a change in a voltage applied or an amount of a change in a voltage applied (relative voltage value). It is understood that the allocation does not have to result from a precise value, but rather the allocation can also relate to a voltage value range, for example, in order to balance tolerances.

In particular, the electronic module can be configured to ascertain a time period of the application of at least one specific voltage value and/or a voltage value range, wherein a function can be allocated to a time period of the application of a specific voltage value and/or a voltage value range. Thus, different functions can be executed when the function button/the trigger is only actuated briefly (simple click) or if the function button/the trigger is held for longer (for example at least 3 seconds, or at least 5 seconds). The time period can be measured, for example, in a firmware of the electronic module.

The electronic module can also be configured to ascertain a sequence of determined voltage values and/or time periods if it is inserted into the holder, wherein one function is allocated to at least one sequence of voltage values and/or time periods. A sequence of determined voltage values can comprise voltage values of one or more voltage value ranges. Thus, complex interaction between the user and the electronic module can be enabled using few buttons and double clicks or multiple clicks can be recognised and used for interactions. For example, a double click or multiple click can be recognised if the function button is operated multiple times within a certain time period.

The electronic module can comprise a camera, a scanner for identifiers (such as barcodes, 2D codes or RFID tags) and/or a display for displaying action orders to the user. The display can be a monochrome or colour display. In particular, the displace can be a passive display, such as an e-ink display. Preferably, the display is not a touch display.

At least one region of the display, in particular a peripheral region, can be allocated to at least one function button. If several function buttons are provided, a separate region of the display can be allocated to each function button (or a part of the function button). The region of the display allocated to the function button is preferably located in close proximity to the function button when the electronic module is inserted into the holder. A function, in particular a currently allocated function, of the function button can be shown to the user in the allocated region of the display. Via the display, the user can also be given feedback as to whether a function button has been operated. For example, one region of the display allocated to the function button can change its colour (e.g. white to black) or briefly blink when the function button is pressed.

The feedback as to whether a function button and/or the trigger are actuated can be visual, acoustic and/or haptic. For visual feedback, an LED can be allocated to said at least one function button/the trigger (additionally or alternatively to being displayed in a display of the electronic module) or the function button/the trigger can comprise an LED, wherein the LED provides visual feedback when actuating the function button and/or when triggering. Similarly, the electronic module can provide in addition or alternatively acoustic feedback and/or haptic feedback (such as vibration).

In addition to the feedback as to whether a function button and/or the trigger are actuated, warnings and dangers can also be reported. Thus, for example, visual, acoustic and/or haptic feedback can be provided when a function has not been correctly executed and, for example, must be repeated.

The allocation of the function and the function button occurs, in particular, via the voltage value that can be determined when actuating the function button. Accordingly, this applies to voltage value ranges, time periods and/or sequences.

Depending on the determined voltage value, the time period and/or depending on the sequence of determined voltage values, the electronic module can execute different functions for controlling the electronic module. These functions can comprise, for example, at least one of the following functions:
  scrolling through a display of the electronic module, in particular through a displayed list;
  inputting characters, in particular numerical values;
  confirming a display of the electronic module;
  activating operations, such as pressing;
  creating a photo, a screenshot or a digital label;
  requesting support;
  controlling further software, such as Android applications, Android business applications, iOS applications, Windows applications and/or ERP (enterprise resource planning) applications;
  controlling and/or activating other hardware, for example a motorised vehicle (e.g. an industrial trucks, in particular activating a self-driving industrial truck), a crane, an automated storage rack or suchlike and/or changing a work mode of the electronic module.

The allocation of the voltage value, voltage value range, time period and/or sequence to a function can be modifiable. Depending on the allocation, the responses (executed functions) of the electronic module change when actuating the function buttons/the trigger.

For example, the allocation can be modified by a user of the electronic module and/or by means of an update to the firmware of the electronic module and/or by means of an update to a corresponding configuration file.

The modifiable allocation enables the function buttons to be used with desired functions. For example, the allocation can be modified to adapt the electronic module to the operation or the user.

In a first allocation, the function buttons can be used in such a way, for example, so that a right-handed person wearing a glove with an electrical circuit assembly and inserted electronic module on the left hand can operate the electronic module with the right hand ergonomically. A second allocation can be provided for a left-handed person wearing a glove with an electrical circuit assembly and inserted electronic module on the right hand, said second allocation using the function buttons substantially mirror-symmetrically to the first allocation. Thus, right-handed and left-handed persons can operate functions with the same fingers (for example the index finger and/or thumb) without having to fear that one of the groups (right-handed or left-handed persons) have a disadvantage ergonomically when operating the electronic module.

In addition, the allocation can be adapted or modified in such a way that the user sets frequently used functions on function buttons that the user finds ergonomically advantageous to reach. Thus, the ergonomics of using the electronic module is improved.

In addition, the allocation can depend on the situation. Depending on the task that a user executes with the electronic module, different functions can be allocated to said at least one function button. For example, complex programmes can be operated via the function buttons, wherein function buttons with different functions can be used depending on the current programme status (main programme, sub-programme) and/or retrieved menu/submenu.

In particular, the electronic module can provide the electrical circuit assembly with electrical energy when the electronic module is inserted into the holder of the electrical circuit assembly. Thus, the electrical circuit assembly can be provided as a passive element (without its own power supply), thereby simplifying integration into other components, such as a glove for example.

The object is also solved by means of a glove, in particular a work glove. The term "glove" is not limited to a garment that completely clothes the hand. Within the meaning of the present invention, a glove is any type of garment that can be worn by the user on the hand.

The glove according to the invention comprises an electrical circuit assembly, as described above, a dorsal section and a fastening section. The fastening section is designed to fasten the dorsal section onto a user's hand. The fastening section can comprise, for example, a strip that can be wound around the user's hand or wrist. Similarly, the fastening section can comprise a tubing section that can be pulled over the user's hand. The dorsal section and the fastening section can be designed integrally or connected to each other (e.g. sown, adhered, welded, etc.).

The holder of the electrical circuit assembly is fixed into position (e.g. adhered, welded, sown, riveted, etc.) on the dorsal section. In particular, an electronic module can be inserted into the holder of the electrical circuit assembly.

If said at least one function button or the function buttons are located on the holder, the user can reach these easily with the other hand and thus operate an inserted electronic module. The trigger of the electrical circuit assembly is preferably attached to the glove spaced apart from the holder so that when being worn the trigger is actuatable by means of the thumb of the hand wearing the glove. This enables the user to trigger the electronic module with one hand without having to interrupt the user's actual work.

BRIEF DESCRIPTION OF THE FIGURES

Additional features and advantages of the invention are found in the following description as well as the attached drawings to which reference is made. In the drawings.

DETAILED DESCRIPTION

Figure 1:
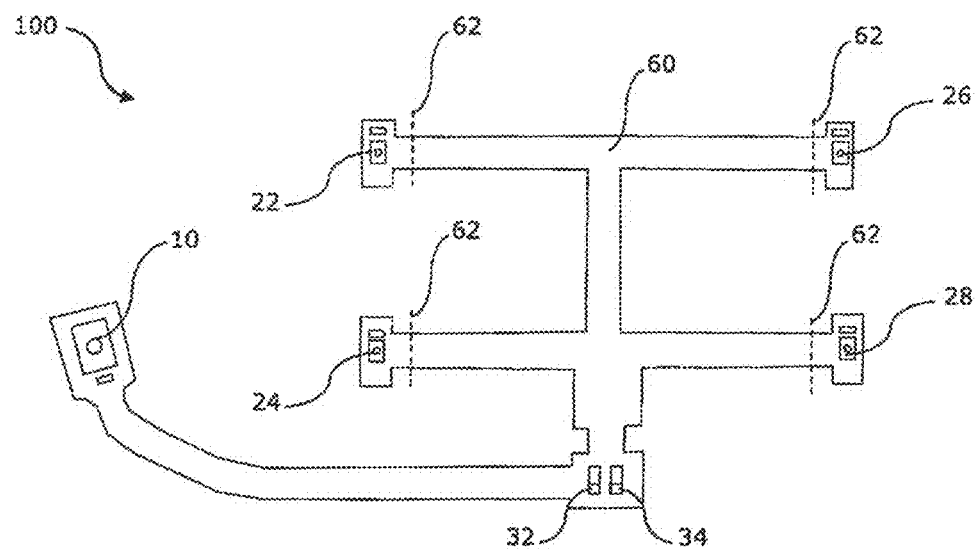
FIG. 1 shows a schematic view of a flex PCB of an electrical circuit assembly according to the present invention.

FIG. 1 shows a schematic view of a flex PCB 60 of an electrical circuit assembly 100 according to the present invention. The electrical circuit assembly 100 and in particular the shown flex PCB can be integrated into a glove (see FIG. 5A, 6A) or fastened onto this. The electrical circuit assembly 100, which is shown in FIG. 1, comprises a trigger 10 comprising a closed and an open state as well as four function buttons 22, 24, 26, 28, which each comprise a closed and an open state. The trigger 10 and the function buttons are designed here as NO switch elements. The switch element is thus in the open state if no external forces act upon the switch element (i.e. it is not actuated).

Figure 2:
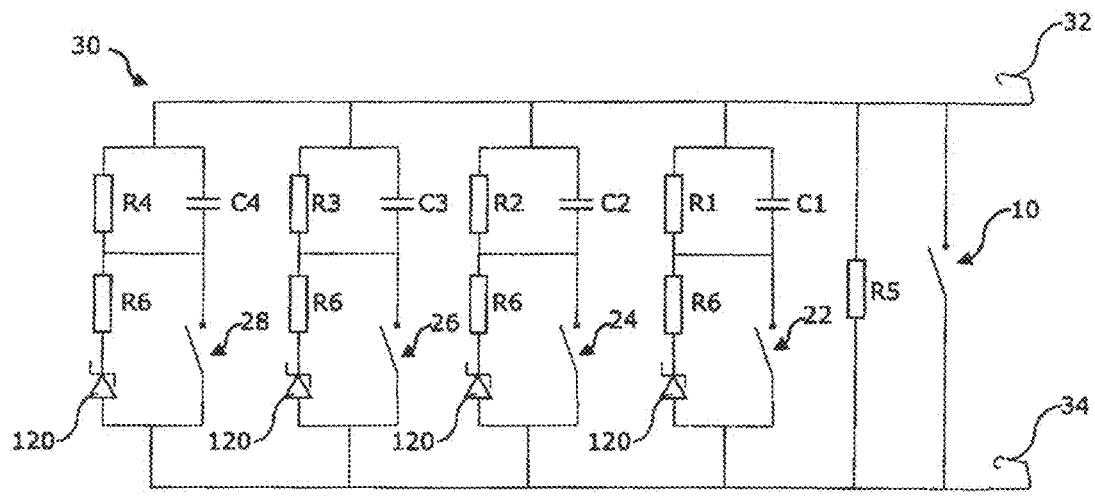
FIG. 2 shows a schematic view of a voltage divider of an electrical circuit assembly according to the present invention.

In addition, two electrical contacts 32, 34 are arranged on the flex PCB 60 of the electrical circuit assembly 100, said electrical contacts 32, 34 being preferably designed as spring contacts. The electrical contacts 32, 34 are connected electrically to the trigger 10 and the function buttons 22, 24, 26, 28 via a voltage divider. A possible embodiment of the voltage divider is shown in FIG. 2.

Due to the voltage divider, an existing electronic module 50 can be triggered and operated using a modified electrical circuit assembly 100 after any adaptation of the software. A modified electrical circuit assembly can comprise, for example, further function buttons or no function buttons. The number of electrical contacts 32, 34 of the electrical circuit assembly that physically contact an electrical mating contact of the electronic module 50 (here two) when the electronic module is inserted can however remain the same. Thus, high downward compatibility of the electronic module is ensured.

Depending on the respective state of the trigger 10 and/or the function buttons 22, 24, 26, 28, a different voltage value can be determined at the electrical contacts 32, 34.

In the shown embodiment, the trigger 10, the function buttons 22, 24, 26, 28 and the electrical contacts 32, 34 are connected electrically to each other via corresponding signal lines or conductor paths of the flex PCB 60. The components of the voltage divider (resistors and optional capacitors and/or diodes) can also be arranged on the flex PCB 60.

The flex PCB 60 can have a bending region 62 which enables bending of the flex PCB by 90° in order to be capable of arranging the flex PCB 60 on the underside of the holder 40, in particular between the holder and a dorsal section of a glove (see FIG. 5A, 6A) and to arrange the function buttons 22, 24, 26, 28 on the holder 40 laterally. This bending region 62 can be particularly flexible compared with the flexibility of the remaining flex PCB. Similarly, the region of the flex PCB 60 running from the electrical contacts 32, 34 to the trigger 10 can be particular flexible so that the trigger 10 can be arranged on the glove, for example, on the side of the index finger (preferably on the side on the first phalanx of the index finger). To this end, the flex PCB runs from the holder 40 over the dorsum of the hand to the trigger. The high degree of flexibility ensures that the glove is donned easily and work with the donned glove is unimpaired.

FIG. 2 shows a schematic view of a voltage divider 30 of an electrical circuit assembly 100 according to the present invention. The circuit between the electrical contacts 32, 34 can be closed via various switch elements, such as the trigger 10 or one of the function buttons 22, 24, 26, 28. If all the switch elements are open, a voltage is applied to the resistor R5. By closing the trigger, this voltage drops, i.e. the applied voltage changes, and the voltage drop corresponds to a first voltage value. The resistors R1, R2, R3 and R4 are allocated to the respective function buttons 22, 24, 26, 28. The size of the resistors R1, R2, R3 and R4 are measured preferably in such a way that the following relation applies:

$$R1<R2<R3<R4<R5$$

In particular, R4 can be approximately twice as large as R3 and R3 can be approximately twice as large as R2 and R2 can be approximately twice as large as R1. In a specific embodiment, the resistance values are, for example, as follows: R5=1 MOhm, R4=47 kOhm, R3=22 kOhm, R2=11 kOhm and R1=4.7 kOhm. It is understood that these values are only exemplary and not restrictive.

The different resistance values mean the voltage value determinable at the electrical contact 32, 34 correlates to the state of the four function buttons and the state of the trigger. In the shown embodiment of the voltage divider, the states of all function buttons can be inferred, at least when the trigger 10 is open, from the determined voltage value. If the trigger is actuated (here closed), the determinable voltage value is independent of the state of the function buttons 22, 24, 26, 28.

The voltage divider also comprises the capacitors C1, C2, C3 and C4. The capacitors C1, C2, C3 and C4 are allocated to the respective function buttons 22, 24, 26, 28. The size of the capacitors C1, C2, C3 and C4 are measured preferably in such a way that the following relation applies:

$$C1 > C2 > C3 > C4$$

In particular, C1 can be approximately twice as large as C2 and C2 can be approximately twice as large as C3 and C3 can be approximately twice as large as C4. The capacitors C1, C2, C3 and C4 can also be charged (even in the case of opened switch elements) via the diodes 120 (here Schottky diodes) and resistors R6. As a result, the voltage applied to the electrical contacts 32, 34 initially briefly increases to the first voltage value when closing the function buttons (voltage peak) and subsequently sinks to the characteristic voltage value (measuring voltage). The voltage peak can be detected in order to recognise an actuation of the function buttons. The subsequently determinable voltage value is then characteristic for the actuated function button/the actuated function buttons. It is understood that the allocation of the voltage value and actuated function buttons do not have to result from a precise voltage value, but rather that the allocation can also relate to a voltage value range.

Figure 3:
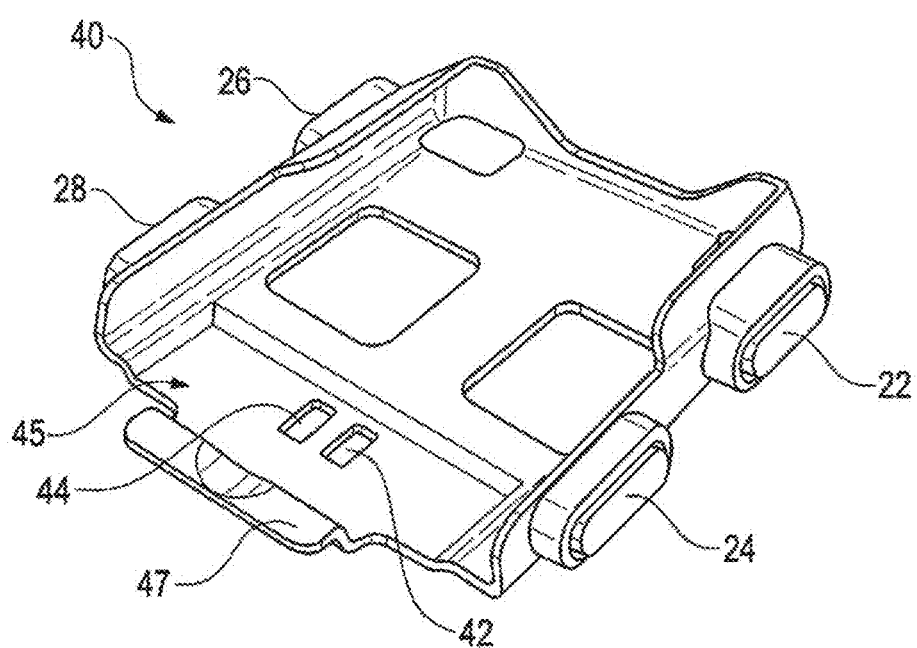
FIG. 3 shows a schematic view of a holder of an electrical circuit assembly according to the present invention.

FIG. 3 shows a schematic view of a holder 40 of an electrical circuit assembly 100 according to the present invention. An electronic module (not shown here) can be slid or inserted into the holder 40, in particular into the receiving region 45, in order to be held in place by the holder 40. To this end, the holder 40 has a locking means 47 (for example in the form of a snap-fit hook) which secures the inserted electronic module in the holder 40.

The holder 40 comprises two electrical contacts 32, 34. The contacts can be located in the receiving spaces 42, 44 in the holder 40. The receiving spaces 42, 44 can be provided, for example, as openings in a base region of the holder 40. This enables the electrical contacts 32, 34 to run from the flex PCB to the underside of the holder 40 into the receiving region 45, in which the electronic module is inserted. In the case of the inserted electronic module, the electrical contacts 32, 34 then physically contact the respective electrical mating contacts of the electronic module. The four function buttons 22, 24, 26 and 28 are arranged laterally on the holder 40.

In the shown embodiment, the function buttons 22, 24, 26 and 28 are substantially the same size. They can however also be different sizes. For example, a first function button, to which a function used regularly or an important function is allocated, can be designed larger than a second function button. In addition, the function buttons, or at least one function button, can be designed in colour to improve the distinctiveness of the function buttons for a user.

Figure 4:
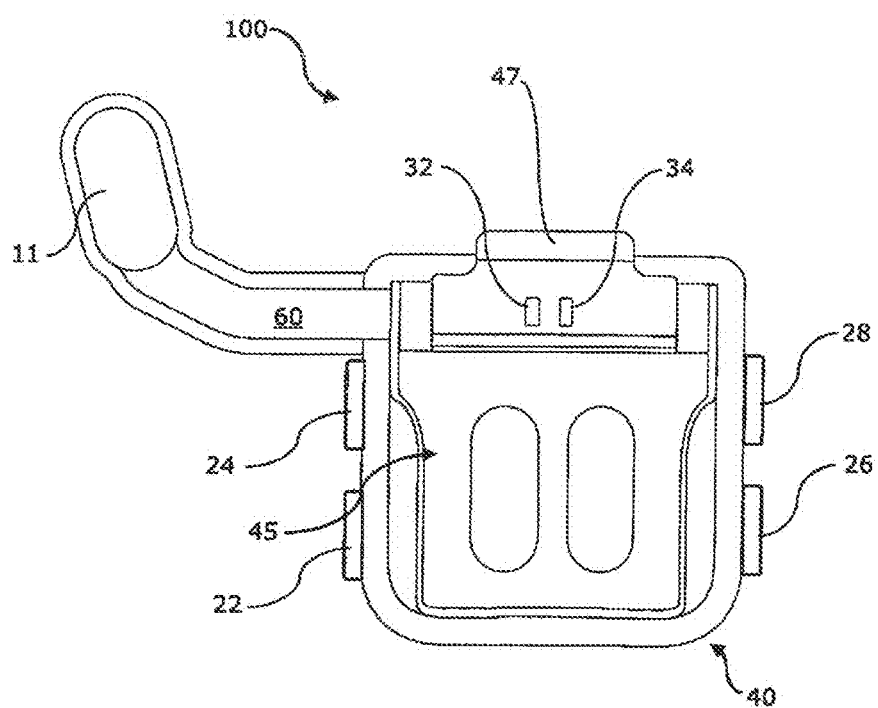
FIG. 4 shows a schematic view of an electrical circuit assembly according to the present invention.

FIG. 4 shows a schematic view of an electrical circuit assembly 100 according to the present invention in a top view. The function buttons 22, 24, 26 and 28 are arranged laterally on the holder 40. These are connected to the electrical contacts 32, 34 and the trigger 10 by means of a flex PCB 60 (see FIG. 1). The trigger 10 is arranged, as shown, spaced apart from the holder 40. An electronic module inserted into the receiving region 45 of the holder 40 (not shown) can be secured and thus held in place in the inserted position by means of the locking means 47.

Figure 5A:
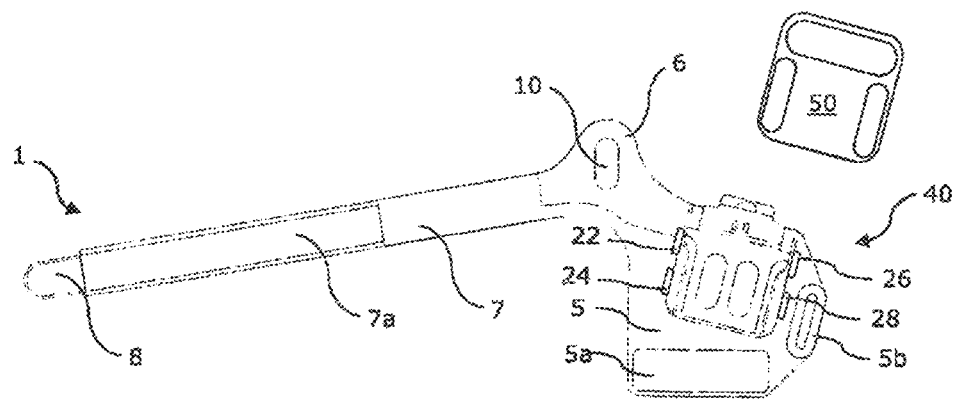
FIG. 5A shows a schematic view of a glove according to the present invention.
Figure 5B:
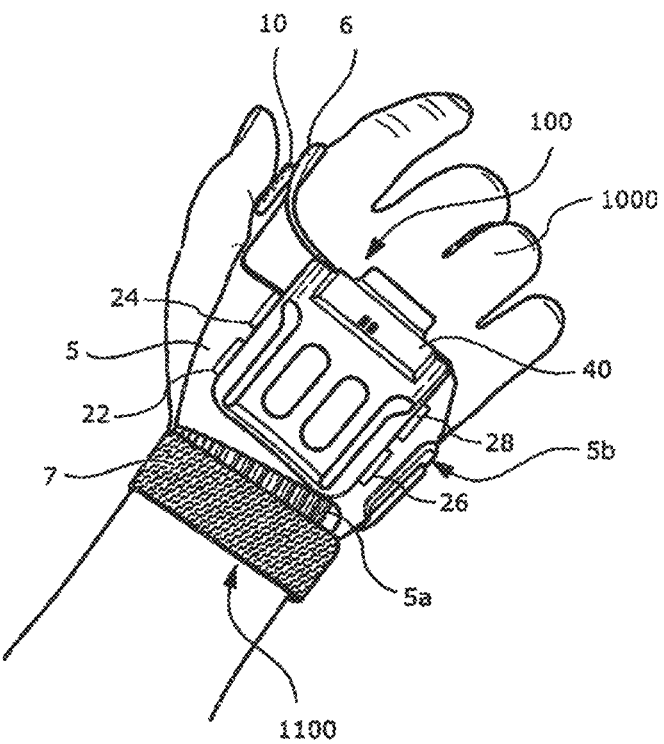
FIG. 5B shows the glove from FIG. 5A that is being worn on a user's hand.

FIG. 5A shows a schematic view of a glove 1 according to the present invention. In FIG. 5B, the glove 1 is located on a user's hand 1000. The glove 1 comprises an electrical circuit assembly, a dorsal section 5 and a fastening section 7. The fastening section 7 is designed to fasten the dorsal section 5 onto a user's hand 1000 (here the right hand).

The holder 40 of the electrical circuit assembly 100 is fixed into position on the dorsal section 5. The trigger 10 of the electrical circuit assembly is attached to the glove 1 on a trigger section 6 spaced apart from the holder 40 so that the trigger 10 is actuatable by means of the thumb of the hand 1000 wearing the glove 1 when glove 1 is being worn (see FIG. 5B).

An electronic module 50 can be inserted into the holder 40 of the electrical circuit assembly. The electronic module 50 is, for example, a compact and robust device for industrial applications. In particular, the electronic module 50 comprises a camera, a scanner for identifiers, such as barcodes, 2D codes or RFID tags and/or a display for displaying action orders to the user. In particular, the electronic module 50 is not a smartphone.

The glove 1 is shown in FIG. 5A in a state stretched out on a flat surface, for example it is spread out on a table.

At least in part, the glove 1 can be made of an elastic material, such as neoprene, limitation leather, synthetic leather (for example microfibers) and/or spacer fabrics. In the embodiment shown here, the entire glove 1 comprises neither fingers nor bases for fingers. The glove 1 also does not comprise a palm section, i.e. a section that rests on the palm of the hand in the correctly worn state and covers the majority of the palm, in particular more than 50%.

The glove 1 of the shown embodiment is thus not a full glove with fingers, but rather a glove which only covers the dorsum of a user's hand 1000 provided it is being worn correctly. The glove 1 is thus similar to a bandage that only surrounds parts of the hand 1000 and does not need to be pulled over the hand, but rather is closed around the hand.

Here, the dorsal section 5 together with the trigger section 6 as well as the fastening section 7, which is designed here as a strap section, are designed as a single piece.

The strap section extends in the shown embodiment from the trigger section 6, more specifically from the side of the trigger section 6 that is facing away from the dorsal section 5. The strap section is designed band-shaped and has an end permanently connected to the trigger section 6 as well as a free end 8. The free end 8 is opposite the end permanently connected to the trigger section 6.

The trigger section 6 is located between the strap section and the dorsal section 5 and is thus the only permanent connection between the strap section and the dorsal section 5.

The strap section can be designed to be stretchable and/or elastic in its longitudinal direction, i.e., in a direction from the free end 8 to the end permanently connected to the trigger section 6. For example, the material of the strap section is stretchable and/or elastic in at least one direction.

On the upper side and/or the underside, the strap section comprises a hook-and-loop-fastener strip 7a that extends in particular across at least half of the length of the strap section. To don the glove 1 on a hand 1000, the strap section can be wound around the user's wrist 1100, guided through an opening 5b on the dorsal section 5 and fastened to a complementary hook-and-loop strip 5a on the dorsal section 5.

The function buttons 22, 24, 26, 28 which can be operated by means of the user's second hand are arranged laterally on the holder 40.

Preferably, a function allowing the operation of the electronic module 50 is allocated to each function button 22, 24, 26, 28 via a corresponding voltage value (or voltage value range), that is determinable when the function button 22, 24, 26, 28 is actuated. Accordingly, functions can be allocated to at least one time period and/or one sequence. This allocation can be modifiable. Depending on the allocation, the response (executed function) of the electronic module 50 changes when actuating the function buttons 22, 24, 26, 28 or the trigger 10.

For example, the allocation can be modified by a user of the electronic module 50 and/or by means of an update to the firmware of the electronic module and/or by means of an update to a corresponding configuration file. The modifiable allocation enables the function buttons 22, 24, 26, 28 to be used with desired functions. For example, the allocation can be modified to adapt the electronic module 50 to the operation or the user. For example, the allocation can be adapted or modified in such a way that the user sets frequently used functions on function buttons that the user finds ergonomically advantageous to reach.

Figure 6A:
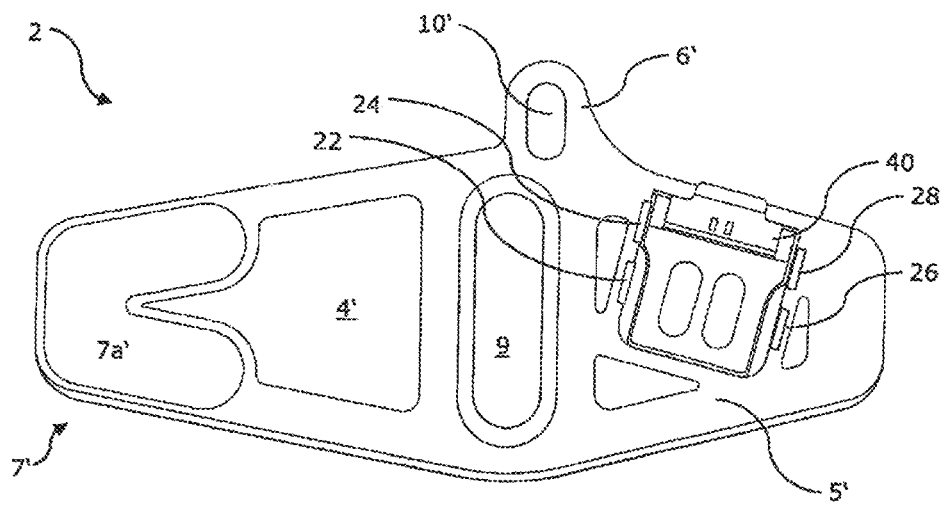
FIG. 6A shows a schematic view of a further glove according to the present invention.
Figure 6B:
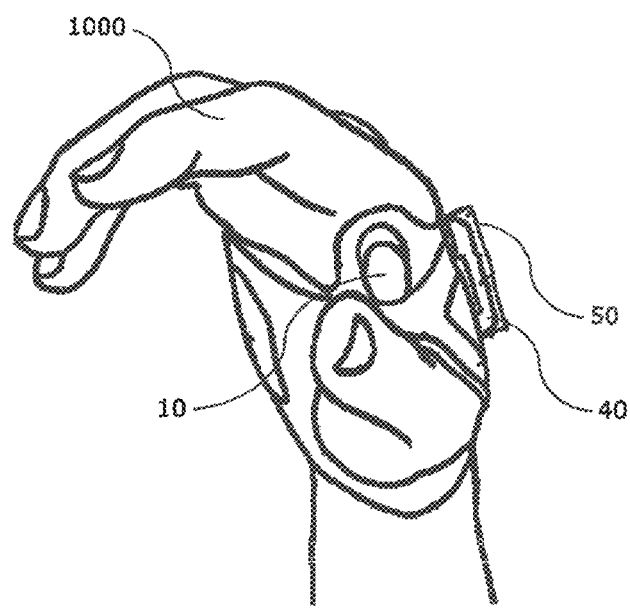
FIG. 6B shows the glove from FIG. 6A that is being worn on a user's hand.

FIG. 6A shows a schematic view of a glove 2 according to the present invention. In FIG. 6B, the glove 2 is located on a user's hand 1000. The glove 2 comprises, just like the glove 1, an electrical circuit assembly, a dorsal section 5' and a fastening section 7'. The fastening section 7' is designed to fasten the dorsal section 5' onto a user's hand 1000 (here the right hand).

The holder 40 of the electrical circuit assembly 100 is fixed into position on the dorsal section 5'. The function buttons 22, 24, 26, 28 which can be operated by means of the user's second hand are arranged laterally on the holder 40. Preferably, a function allowing the operation of the electronic module 50 is allocated to each function button 22, 24, 26, 28 via a corresponding voltage value (or voltage value range), that is determinable when the function button 22, 24, 26, 28 is actuated. This allocation can be modifiable.

The trigger 10' of the electrical circuit assembly is attached to the glove 2 on a trigger section 6' spaced apart from the holder 40 so that the trigger 10' is actuatable by means of the thumb of the hand 1000 wearing the glove 2 when the glove 2 is being worn (see FIG. 6B). An electronic module 50 is inserted into the holder 40 of the electrical circuit assembly in FIG. 6B. The electronic module 50 is, for example, a compact and robust device for industrial applications. In particular, the electronic module 50 comprises a camera, a scanner for identifiers, such as barcodes, 2D codes or RFID tags and/or a display for displaying action orders to the user. In particular, the electronic module 50 is not a smartphone.

The glove 2 is shown in FIG. 6A in a state stretched out on a flat surface, for example it is spread out on a table.

At least in part, the glove 2 can be made of an elastic material, such as neoprene, limitation leather, synthetic leather (for example microfibers) and/or spacer fabrics. In the embodiment shown here, the entire glove 2 comprises neither fingers nor bases for fingers. In contrast to the glove 1, the glove 2 has a palm section 4', i.e. a section that rests on the palm of the hand in the correctly worn state and covers the majority of the palm, in particular more than 50%.

Thus, the glove 2 of the shown embodiment is also not a full glove with fingers, but rather a glove which only covers the dorsum and the palm of a user's hand 1000 provided it is being worn correctly. The glove 2 is thus similar to a cuff that only surrounds parts of the hand 1000 and does not need to be pulled over the hand, but rather is closed around the hand.

Here, the dorsal section 5' is designed with the trigger section 6' and the palm section 4' as a single piece. The lateral end of the palm section 4' facing away from the dorsal section 5' forms the fastening section 7'. The trigger section 6' is situated between the palm section 4' and the dorsal section 5'. A thumb opening 9 is designed between the palm section 4' and the dorsal section 5'.

The fastening section 7' comprises a hook-and-loop strip 7a' on the upper side and/or the underside. To don the glove 2 on a hand 1000, the thumb is guided through the thumb opening 9 and the glove is closed around the hand by means of the fastening section 7', in particular the hook-and-loop strip 7a'.

Several embodiments described here have been described in more detail with reference to the drawings. Other embodiments are however also part of the object disclosed here. The disclosed object is not to be construed under any circumstances as being limited to the embodiments explicitly described here; but rather these embodiments are listed as examples in order to convey the scope of the object to the person skilled in the art.

Figure 7:
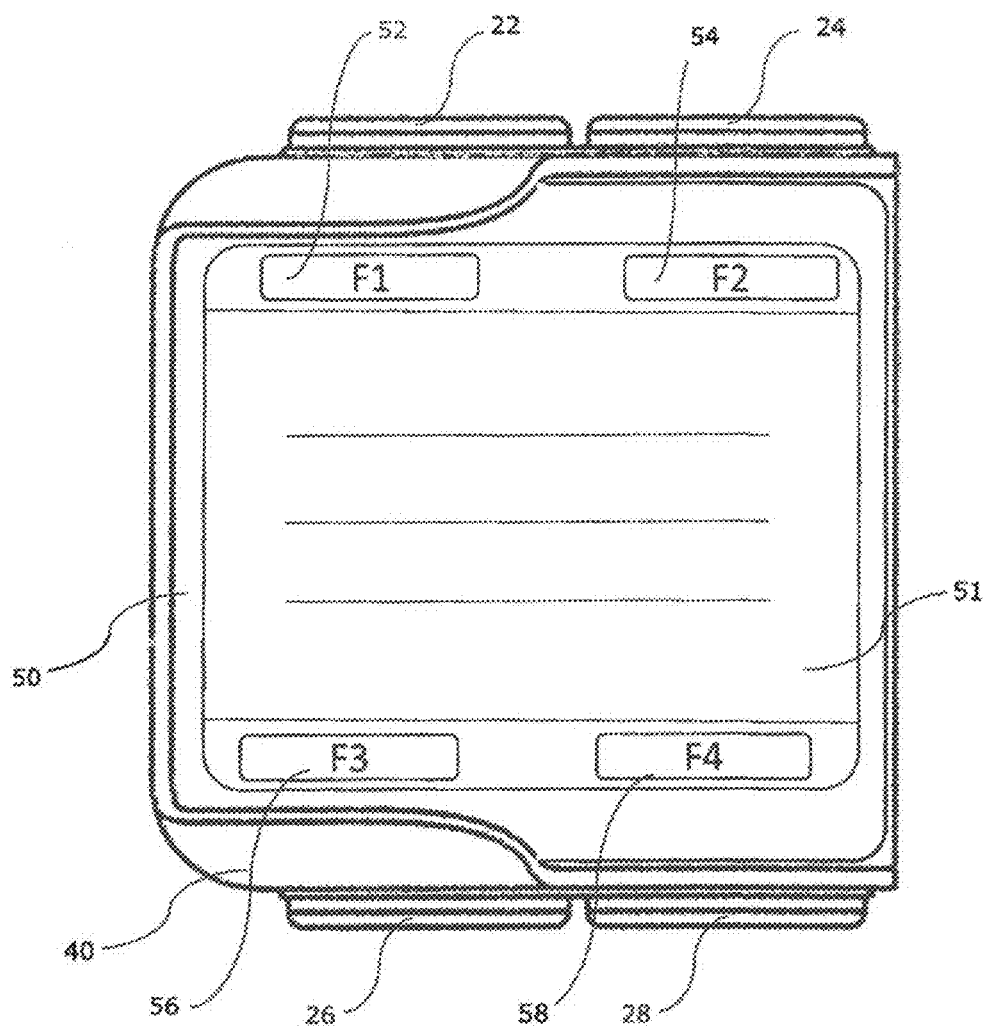
FIG. 7 shows a schematic view of a holder of an electrical circuit assembly comprising an inserted electronic module.

FIG. 7 shows a schematic view of a holder 40 of an electrical circuit assembly 100 comprising an inserted electronic module 50. The electronic module 50 comprises a display 51 that is used to display information and/or action orders to a user. Information and/or action orders can be shown, for example, centrally on the display (here symbolised by parallel lines). The display can be graphic and/or text-based. The display 51 can be a monochrome display, for example an e-ink display. Preferably, the display is not a touch display.

A region of the display, here a peripheral region 52, 54, 56, 58, is allocated in each case to the function buttons 22, 24, 26, 28. In the allocated region 52, 54, 56, 58 of the display 51, a currently allocated function F1, F2, F4, F4 of the corresponding function button 22, 24, 26, 28 can be shown to the user. In addition, feedback can be given to the user via the display as to whether a function button 22, 24, 26, 28 has been operated. For example, one region of the display 51 allocated to the function button can change its colour (e.g. white to black) or briefly blink when the function button 22, 24, 26, 28 is pressed.

The allocation of the function button (e.g. voltage value, voltage value range, time period and/or sequence) to a function can be modifiable. If the allocation is changed, the user is preferably shown the amended allocation in the corresponding region 52, 54, 56, 58 of the display 51.

The present invention can of course be designed in another way as described here without impairing any key features of the invention as a result. The present embodiments are exemplary in every respect and are not to be considered restrictively; and all modifications that fall under the scope of the enclosed claims are to be included in it.

LIST OF REFERENCE SIGNS

1, 2 glove
4 palm section
5 dorsal section
6 trigger section 7 fastening section
8 free end
9 thumb opening
10 trigger
11 trigger
22 function button
24 function button
26 function button
28 function button
30 voltage divider
32 electrical contact
34 electrical contact
40 holder
42 receiving space for the electrical contact
44 receiving space for the electrical contact
45 receiving region for the electronic module
47 locking means for the electronic module
50 electronic module
51 display
52 display region
54 display region
56 display region
58 display region
60 flex PCB (flexible printed circuit board)
62 bending region
100 electrical circuit assembly
120 Schottky diode
1000 hand
1100 wrist
C1 capacitor
C2 capacitor
C3 capacitor
C4 capacitor
R1 resistor
R2 resistor
R3 resistor
R4 resistor
R5 resistor
R6 resistor

The invention claimed is:

1. An electrical circuit assembly for a glove, the electrical circuit assembly comprising:
    a trigger comprising a closed and an open state;
    at least one function button comprising a closed and an open state;
    a holder, wherein an electronic module can be inserted into the holder in order to be held in place by the holder, and wherein the holder comprises at least one electrical contact which physically contacts an electrical mating contact of the electronic module when the electronic module is inserted, and
    a voltage divider, wherein said at least one electrical contact is connected electrically to the trigger and said at least one function button via the voltage divider so that
    depending on the respective state of the trigger and/or said at least one function button, a different voltage value is determinable at said at least one electrical contact,
    wherein the voltage divider comprises at least one capacitor, which is allocated said at least one function button, and wherein the at least one capacitor is connected to the at least one function button in such a way that, when actuating the at least one function button, the voltage value determinable at the at least one electrical contact sinks from a first voltage to a measuring voltage.

2. The electrical circuit assembly according to claim 1, wherein the electrical circuit assembly comprises at least two function buttons, wherein the at least two function buttons each comprise a closed and an open state, and wherein the at least two function buttons are connected electrically to said at least one electrical contact via the voltage divider.

3. The electrical circuit assembly according to claim 1, wherein the at least one function button is arranged on the holder, and wherein the trigger is arranged spaced apart from the holder.

4. The electrical circuit assembly according to claim 1,
    wherein the trigger is a normally closed (NC) switch element or a normally open (NO) switch element, and/or
    wherein the at least one function button is an NC switch element or an NO switch element.

5. The electrical circuit assembly according to claim 1, wherein the electrical circuit assembly comprises at least two function buttons, wherein the voltage value determinable at the at least one electrical contact is characteristic for the states of all of the at least two function buttons, in any event when the trigger is in the open state.

6. The electrical circuit assembly according to claim 1, wherein the voltage value determinable at the at least one electrical contact is independent of the state of the at least one function button when actuating the trigger.

7. The electrical circuit assembly according to claim 1, wherein
    the holder comprises two electrical contacts which each physically contact an electrical mating contact of the electrical module when the electronic module is inserted, and wherein
    the two electrical contacts are connected electrically to said one voltage divider in such a way that depending on the respective state of the trigger and/or said at least one function button a different voltage value is determinable at the two electrical contacts.

8. The electrical circuit assembly according to claim 7, wherein the two electrical contacts are the only electrical contacts of the holder which physically contact the electrical mating contacts of the inserted electronic module.

9. The electrical circuit assembly according to claim 1, wherein
    the trigger and said at least one electrical contact are connected electrically to each other via a signal line, and/or wherein
    said at least one function button and said at least one electrical contact are connected electrically to each other via a signal line.

10. The electrical circuit assembly according to claim 9, wherein the signal line is a flex PCB.

11. The electrical circuit assembly according to claim 9, wherein the trigger, said at least one function button and said at least one electrical contact are connected electrically to each other via a shared flex PCB.

12. An electronic module that is insertable into the holder of the electrical circuit assembly according to claim 1, wherein the electronic module at least
    comprises one electrical mating contact which physically contacts said at least one electrical contact of the electrical circuit assembly when the electronic module is inserted into the holder, wherein
    the electronic module is triggerable by actuating the trigger and operable by actuating said at least one function button.

13. The electronic module according to claim 12, wherein the electronic module comprises at least one of:
    a camera;

a scanner for identifiers, the identifiers being barcodes, 2D codes or RFID tags, and/or
a display for displaying action orders to a user.

14. The electronic module according to claim 12,
wherein the electronic module is configured to determine different voltage values and/or voltage value ranges at said at least one electrical contact when the electronic module it is inserted into the holder, and
wherein at least one of the voltage values and/or the voltage value ranges is indicative of a function, and/or wherein the electronic module is configured to ascertain a time period of an application of the at least one of the voltage values and/or the voltage value ranges, the time period of the application of the at least one of the voltage values and/or the voltage value ranges being indicative of the function.

15. The electronic module according to claim 12, wherein the electronic module is configured to ascertain a sequence of determined voltage values and/or time periods when it is inserted in the holder, and wherein
a function is allocated to at least one sequence of voltage values and/or time periods.

16. The electronic module according to claim 15, wherein the electronic module executes different functions for controlling the electronic module depending on the determined voltage value, a time period and/or depending on the sequence of determined voltage values, wherein these functions comprise at least one of the following functions:
scrolling through a display of the electronic module, including a displayed list;
inputting numerical values;
confirming the display of the electronic module;
activating operations, including pressing;
creating a photo, a screenshot or a digital label;
requesting support;
controlling further software;
controlling and/or activating another hardware and/or changing a work mode of the electronic module.

17. The electronic module according to claim 12, wherein the electronic module supplies the electrical circuit assembly with electrical energy when the electronic module is inserted in the holder of the electrical circuit assembly.

18. A glove, comprising
the electrical circuit assembly according to claim 1;
a dorsal section,
and a fastening section, wherein the fastening section is configured to fasten the dorsal section onto a user's hand, and wherein
the holder of the electrical circuit assembly is fixed into position on the dorsal section, and wherein
the trigger of the electrical circuit assembly is attached to the glove spaced apart from the holder so that when the glove is being worn the trigger is actuatable by means of a thumb of the user's hand wearing the glove.

19. The glove according to claim 18, further comprising an electronic module including one electrical mating contact which physically contacts said at least one electrical contact of the electrical circuit assembly when the electronic module is inserted into the holder, wherein the electronic module is triggerable by actuating the trigger and operable by actuating said at least one function button, wherein the electronic module is inserted into the holder of the electrical circuit assembly.

20. An electrical circuit assembly for a glove, the electrical circuit assembly comprising:
a trigger comprising a closed and an open state;
at least one function button comprising a closed and an open state;
a holder, wherein an electronic module can be inserted into the holder in order to be held in place by the holder, and wherein the holder comprises at least one electrical contact which physically contacts an electrical mating contact of the electronic module when the electronic module is inserted, and
a voltage divider, wherein said at least one electrical contact is connected electrically to the trigger and said at least one function button via the voltage divider so that
depending on the respective state of the trigger and/or said at least one function button, a different voltage value is determinable at said at least one electrical contact,
wherein the holder comprises two electrical contacts which each physically contact an electrical mating contact of the electrical module when the electronic module is inserted,
wherein the two electrical contacts are connected electrically to said one voltage divider in such a way that depending on the respective state of the trigger and/or said at least one function button a different voltage value is determinable at the two electrical contacts, and
wherein the two electrical contacts are the only electrical contacts of the holder which physically contact the electrical mating contacts of the inserted electronic module.

* * * * *